US012072145B2

(12) United States Patent
Steffensen et al.

(10) Patent No.: US 12,072,145 B2
(45) Date of Patent: Aug. 27, 2024

(54) GAS DISPERSER FOR A SPRAY DRYER AND METHODS

(71) Applicant: GEA Process Engineering A/S, Søborg (DK)

(72) Inventors: Mads Lund Steffensen, Søborg (DK); Kristian Mark Ingvorsen, Søborg (DK); Jasbir Dhanoa, Søborg (DK)

(73) Assignee: GEA Process Engineering A/S (DK)

( * ) Notice: Subject to any disclaimer, the term of this patent is extended or adjusted under 35 U.S.C. 154(b) by 768 days.

(21) Appl. No.: 17/254,801

(22) PCT Filed: Jun. 29, 2018

(86) PCT No.: PCT/DK2018/050175
§ 371 (c)(1),
(2) Date: Dec. 21, 2020

(87) PCT Pub. No.: WO2020/001713
PCT Pub. Date: Jan. 2, 2020

(65) Prior Publication Data

US 2021/0293477 A1 Sep. 23, 2021

(51) Int. Cl.
*B01D 1/18* (2006.01)
*F15D 1/00* (2006.01)
*F26B 3/12* (2006.01)
*F26B 21/00* (2006.01)

(52) U.S. Cl.
CPC .................. *F26B 3/12* (2013.01); *B01D 1/18* (2013.01); *F15D 1/001* (2013.01); *F26B 21/00* (2013.01)

(58) Field of Classification Search
CPC .................................... F26B 3/12; B01D 1/18
See application file for complete search history.

(56) References Cited

U.S. PATENT DOCUMENTS 2,887,390 A * 5/1959 Coulter .................. A23B 7/026 159/4.03
4,351,849 A * 9/1982 Meade ................. A23G 3/0205 426/294
4,493,750 A * 1/1985 Olmsted ................... B05B 7/00 203/99
2012/0017899 A1 1/2012 Yeates et al.
2014/0088768 A1* 3/2014 Haley ..................... A61M 1/38 700/283
2016/0256794 A1* 9/2016 Schønfeldt ............... B01D 1/18

FOREIGN PATENT DOCUMENTS

FR 1289817 A 4/1962
WO 2007/071238 A1 6/2007
WO 2011/047676 A1 4/2011
WO 2015/059261 A1 4/2015

* cited by examiner

*Primary Examiner* — Jonathan Luke Pilcher
(74) *Attorney, Agent, or Firm* — Condo Roccia Koptiw LLP

(57) ABSTRACT

In the gas disperser (3), a flow conditioning device (5, 6) is located in the inlet duct section (32). The flow conditioning device comprises a hole plate (5) and a flow straightener (6) positioned in parallel with and at a distance (h) in the axial direction (axd) from the downstream side of the hole plate (5). The hole plate (5) has a predefined hole plate thickness (tp) in the axial direction (axd) and each flow straightener (6) has a predefined flow straightener length (Is) in the axial direction (axd), the flow straightener length (Is) being substantially larger than the hole plate thickness (tp).

15 Claims, 9 Drawing Sheets

GAS DISPERSER FOR A SPRAY DRYER AND METHODS

CROSS REFERENCE TO RELATED APPLICATIONS

This application is the National Stage Entry under 35 U.S.C. § 371 of Patent Cooperation Treaty Application No. PCT/DK2018/050175, filed 29 Jun. 2018, the entire contents of which are hereby incorporated by reference herein.

TECHNICAL FIELD

The present invention relates to a gas disperser for guiding gas into a chamber of a gas treatment apparatus, comprising an inlet duct section with an upstream end and a downstream end, and with an internal diameter defining a cross-sectional area, the inlet section defining an axial direction, a radial direction and a tangential direction, and a flow conditioning device located in the inlet duct section.

BACKGROUND ART

Examples of such gas treatment apparatus are spray dryers and convective dryers, known in the art for a large number of purposes. Thus, for instance in food, dairy, and chemical business spray dryers are used for providing a dry granular, particulate and/or powdery product from a liquid feed by spraying the feed into a spray dryer chamber together with air or another gas that provides for evaporating a solvent of the liquid feed and/or reacts with the feed.

An air disperser, or gas disperser, is normally provided to introduce the gas into the chamber from a suitable gas supply. For a number of reasons, it is important to obtain a suitable flow of drying gas in order to obtain a uniform drying of the droplets in the chamber, and to meet a number of demands, including avoidance of deposits on the chamber walls, manufacture of a high-quality product, and retention of a high production capacity and efficiency.

In order to provide a satisfactory flow of the drying gas, it is common to provide an upstream ducting construction as one measure of aligning the stream of drying gas before it enters the drying chamber. Such ducting may include vertical ducts positioned next to the drying chamber, duct bends or elbows and generally horizontal duct sections connected to the gas disperser. This often results in an elaborate and bulky equipment upstream of the supply pipe. Additional or alternative measures include relatively complex gas disperser designs, typically including a large number of guide vanes.

Recent examples of prior art gas dispersers addressing the topics mentioned in the above are found in Applicant's published international applications No. WO 2007/071238 A1 and WO 2011/047676 A1. A further variant is found in WO 2015/059261 A1. Examples of flow conditioning devices directed to obtaining a more uniform distribution of the gas are known from for instance FR patent No. 1 289 817 (Niro).

Even though it is possible to obtain fluid conditions meeting the requirements with the prior art apparatus, there is still a need for more simple and cost-effective solutions.

SUMMARY OF INVENTION

With this background, it is the object of the invention to provide a gas disperser, by which it is possible to obtain a satisfactory flow while at the same time being of a relatively simple and compact design.

In a first aspect, this and other objects are achieved by a gas disperser of the kind mentioned in the introduction, which is further characterized in that said flow conditioning device comprises at least one hole plate having a diameter substantially corresponding to the internal diameter of the inlet duct section and defining a cross-sectional area substantially corresponding to the cross-sectional area of the inlet duct section, and at least one flow straightener having a diameter substantially corresponding to the internal diameter of the inlet duct section and defining a cross-sectional area substantially corresponding to the cross-sectional area of the inlet duct section, that the at least one flow straightener is positioned substantially in parallel with and at a distance in the axial direction from the downstream side of the at least one hole plate, and that each hole plate has a predefined hole plate thickness in the axial direction and each flow straightener has a predefined flow straightener length in the axial direction, the flow straightener length being substantially larger than the hole plate thickness.

By combining an upstream hole plate with a downstream flow straightener in this way, it has been made possible to condition the flow in a simple and efficient manner. The uniformity of the flow in the axial flow direction has been increased, while the undesired velocity components, that is the in-plane velocities have been reduced, while at the same time, the conditioning device is easy to manufacture and install.

In a presently preferred embodiment, each hole plate is provided a plurality of holes distributed over substantially the entire cross-sectional area of the hole plate. This provides for a simple design which is advantageous from a manufacturing and cleaning point of view. Preferably, each hole has a cross-sectional dimension in the same order of magnitude as the hole plate thickness.

The number, size and shape of the holes in the hole plate or hole plates may be chosen in accordance with factors such as dimensions of the gas disperser, gas entry velocity etc. Advantageously, the hole plate thickness is in the range 0.0005 to 0.05 of the internal diameter of the inlet duct section, preferably about 0.01 of the internal diameter of the inlet duct section. The ratio between the total area of the holes and the area of the hole plate may lie in the range 0.2 to 0.8, preferably about 0.5. The shape of the holes may for instance be selected from the group comprising: circular, oval, ovoid, rectangular, polygonal. Values in these ranges and such shapes have proven to function well in simulations. If more than one hole plate, the configuration may be the same or vary between individual hole plates.

In principle, the holes in the hole plate may be provided in any suitable manner which provides for ease of manufacture and reliable cleaning properties. In one embodiment, the hole plate is formed as a perforated plate of plate material in which the plurality of holes have been provided. Alternatively, the hole plate may be formed as a mesh formed by mesh threads defining said plurality of holes between them.

In another presently preferred embodiment, the flow straightener is provided with a plurality of flow channels, each having a longitudinal extension in parallel with the axial direction. This design provides for a consistent and well-proven way of straightening the flow. However, it is also conceivable to form the flow straightener as a spiral.

The length of the flow straightener is typically chosen in accordance with other dimensions of the gas disperser. Advantageous values of the length are in the range 0.005 to 1 of the internal diameter of the inlet duct section, preferably about 0.1 of the internal diameter of the inlet duct section.

The ratio between the total area of the flow channels and the area of the flow straightener is preferably high and advantageous values of the ratio lie in the range 0.8 to 0.99.

Configurations of the flow straightener may in principle be chosen arbitrarily, but in a preferred embodiment, the flow straightener comprises intersecting first and second sets of vanes, preferably extending at right angles to each other, thus forming a plurality of cross-sectionally rectangular flow channels. In a further development of this preferred embodiment, the vanes of the first and the second sets of vanes are positioned equidistantly and the flow channels are substantially square in cross-section. In addition to being simple to manufacture, such a design provides for the desired flow straightening properties.

In an alternative preferred embodiment, the flow straightener comprises at least one tangential vane and at least one set of radial vanes forming a plurality of arc-shaped flow channels. In further developments of this embodiment, the flow straightener comprises a first, second, third and fourth tangential vane arranged concentrically, and/or the flow straightener comprises a first, second, and third set of radial vanes, each set of radial vanes being distributed in the tangential direction of the flow straightener. Such a concentric pattern is a well-proven concept in aligning the flow.

The number and size of the flow channels may be chosen in accordance with parameters such as overall dimensions of the gas disperser etc. Typically, the vanes are formed with a relatively low thickness to maximize the open area. Advantageous values of the number of flow channels are in the range 25 to 150 per square meter of the inlet duct section, preferably 50 to 100, most preferable 70 to 80.

Without wishing to be bound by theory, it is believed that the advantageous effects of the conditioning device according to the invention are dependent on the fact that the hole plate and the flow straightener are positioned close to each other in the axial direction. In a preferred embodiment, the distance separating the flow straightener from the downstream side of the hole plate in the axial direction is below 10 times the hole plate thickness, preferably below 5 times the hole plate thickness.

More than one hole plate and more than one flow straightener may be provided, just as several sets of one hole plate and one flow straightener may be provided.

In a second aspect of the invention, a spray drying apparatus comprising such a gas disperser is provided, and in a third aspect, a method of aligning a stream of gas in a gas disperser is devised.

Other presently preferred embodiments and further advantages will be apparent from the subsequent detailed description and drawings.

BRIEF DESCRIPTION OF DRAWINGS

In the following description embodiments of the invention will be described with reference to the schematic drawings, in which.

DESCRIPTION OF EMBODIMENTS

Figure 1:
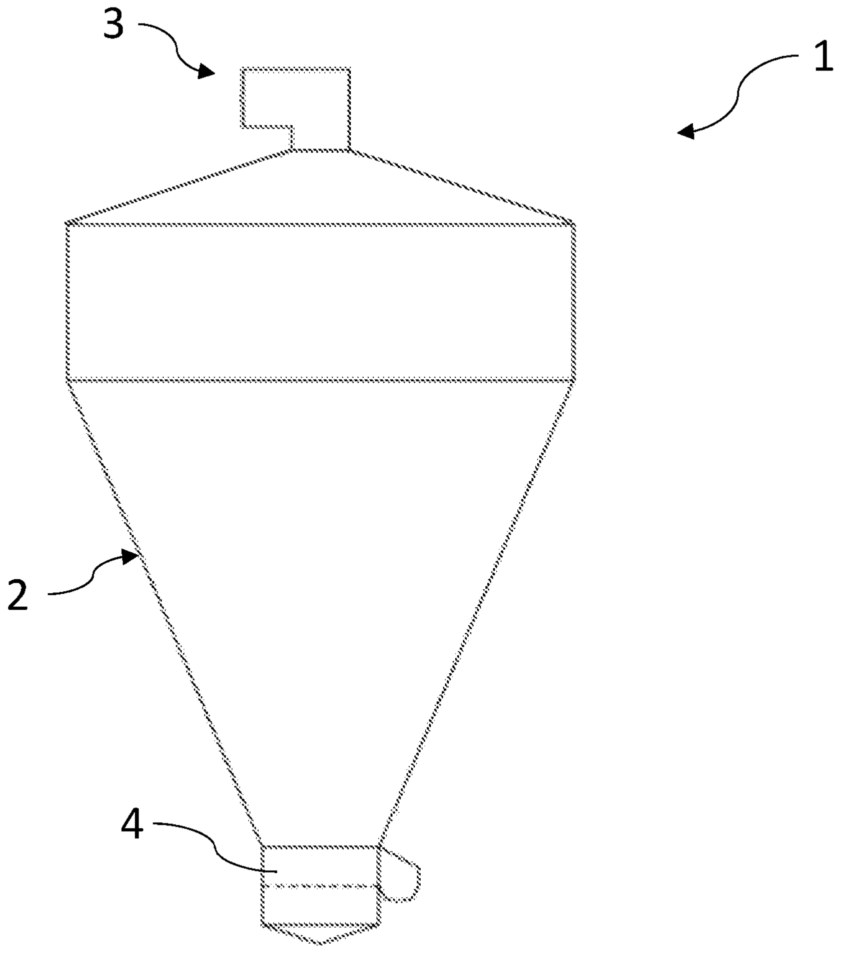
FIG. 1 is a schematic plan view of a spray drying apparatus incorporating a gas disperser.
Figure 2A:
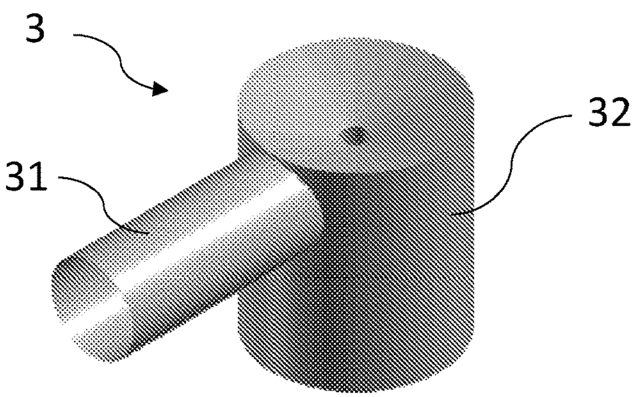
FIGS. 2*a* to 2*e* show perspective views of various configurations of gas dispersers.
Figure 2B:
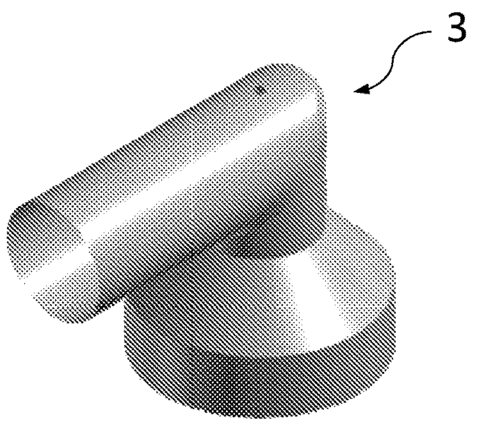
Figure 2C:
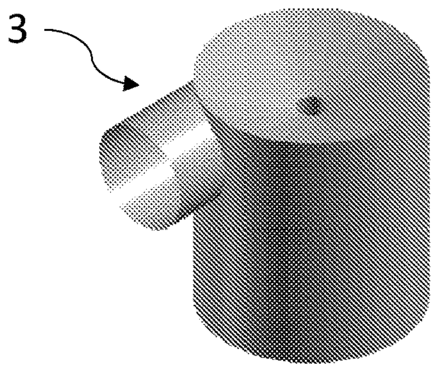
Figure 2D:
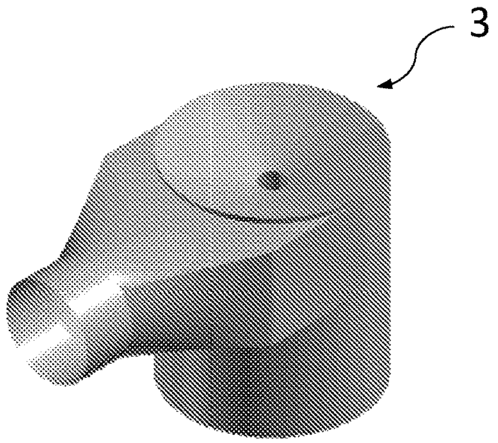
Figure 2E:
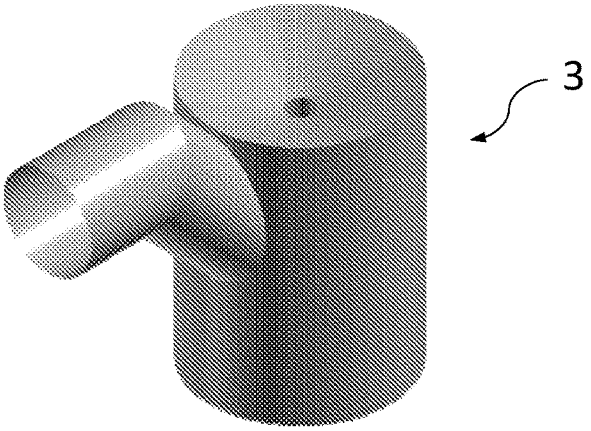

Referring initially to FIG. 1, the general configuration of a spray drying apparatus is shown as one example of a device requiring a supply of air or gas to be guided to and introduced into the device. The fundamentals underlying the present invention are applicable to other devices than the spray dryer shown and described, including convective dryers, heaters, spray coolers, fluid beds, belt dryers, and upstream and downstream of heaters and filters etc.

The spray drying apparatus 1 comprises a drying chamber 2 in which a feed is atomized by atomizing means (not shown) including an atomizer wheel, atomizing nozzles or the like. A gas disperser generally designated 3 is shown, here mounted at the ceiling of the drying chamber. At the bottom of the drying chamber 2, an outlet 4 is provided for discharging a product. Auxiliary operational units may be present, including cyclones, filters and after-treatment units.

The gas disperser 3 may take many different configurations as indicated in FIGS. 2*a* to 2*e*. Common to all of them is that they are intended for guiding gas into a chamber 2 of a gas treatment apparatus, here the spray drying apparatus 1, from a gas supply, through a supply duct section 31 and further through an inlet duct section 32 in fluid communication with the interior of the drying chamber 2.

Figure 3:
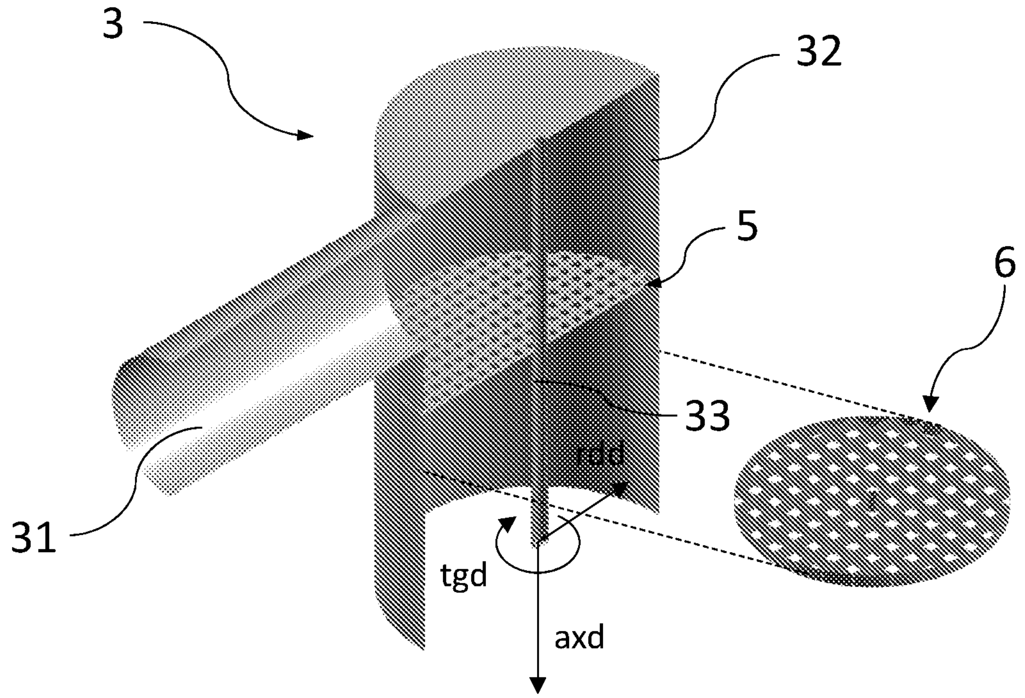
FIG. 3 is a partial perspective sectional view of a gas disperser in an embodiment of the invention.
Figure 4:
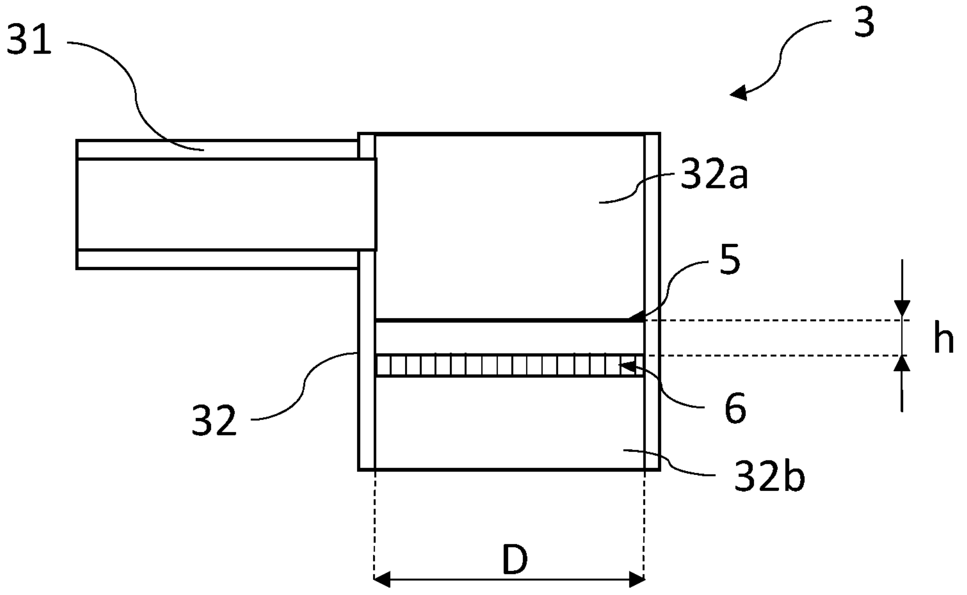
FIG. 4 is a schematic side sectional view of the gas disperser of the embodiment of FIG. 3.

Referring initially to FIGS. 3 and 4, a more detailed description of the components of embodiments of the gas disperser 3 will be given.

The inlet duct section 32 has an upstream end 32*a* and a downstream end 32*b*. The upstream end 32*a* is located adjacent the supply duct section 31 and the downstream end 32*b* is located at the entry to the drying chamber 2 (not shown in FIG. 3). The inlet duct section 32 is provided as a substantially straight pipe of a circular cylindrical shape and defines an axial direction axd, corresponding to a longitudinal axis of the inlet duct section 32. Other configurations of the cross-sectional shape of the inlet duct section are conceivable as well, including square or rectangular. A radial direction rdd and a tangential direction tgd are defined relative to the axial direction axd and will also be referred to jointly as in-plane directions. The inlet duct section 32 has a total length denoted H and an internal diameter D defining a cross-sectional area which is here substantially circular.

A flow conditioning device is located in the inlet duct section 32, in the embodiment of FIGS. 3 and 4 in the form of one hole plate 5 and one flow straightener 6. The flow conditioner is provided for the purpose of changing one or more characteristics of the flow, e.g. increasing the uniformity in the flow direction, decreasing velocities perpendicular to flow direction or adding swirl. In the embodiments shown, the general flow direction coincides with the axial direction axd, and the undesired velocity components are the in-plane velocities, i.e. the velocity components of the flow in the radial and tangential directions, rdd and tgd. However, the invention is also applicable to technical applications in which it is desirable to induce a controlled swirl.

The hole plate 5 and the flow straightener 6 each has a diameter substantially corresponding to the internal diameter D of the inlet duct section 32 and defining a cross-sectional area substantially corresponding to the cross-sectional area of the inlet duct section 32. The flow straightener 6 is positioned substantially in parallel with and at a distance h in the axial direction axd from the downstream side of the at least one hole plate 5. The distance h according to the invention is chosen to encompass such mutual positions that the hole plate 5 and the flow straightener 6 are "at", "near" "close" or "immediately adjacent" each other.

Figure 5A:
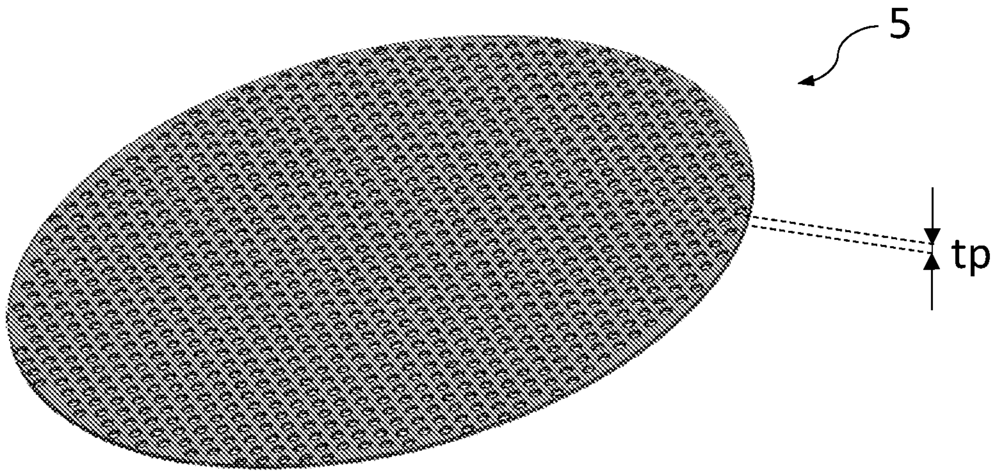
FIGS. 5*a* and 5*b* are perspective and break-out views on larger scales of a hole plate of one embodiment of the gas disperser.

The hole plate 5 has a predefined hole plate thickness tp (cf. FIG. 5*a*) in the axial direction axd and each flow straightener 6 has a predefined flow straightener length Is (cf. FIG. 8*b*) in the axial direction axd. Whereas the hole plate 5 is a plane element of small thickness, the flow straightener has a substantial extension in the axial direction axd such that the flow straightener length Is is substantially larger than the hole plate thickness tp. By the terms "small thickness", "substantial extension" and "substantially larger", the skilled person will recognize that although such dimensions, or relative dimensions, may vary, they need to be chosen to fulfill the requirements to strength and ability to withstand the operational conditions in a gas disperser 3.

Expressed in relative dimensions, the distance h separating the flow straightener 6 from the downstream side of the hole plate 5 in the axial direction axd is for instance below 10 times the hole plate thickness tp, preferably below times the hole plate thickness tp.

Correspondingly, the flow straightener length Is is preferably larger than the hole plate thickness tp by a factor in the range 5 to 200, for instance by a factor 10 to 150.

As a further element shown in FIG. 3, there is shown a central rod 33 extending in the axial direction axd. The central rod 33 does not form part of the present invention, but is a component provided for guiding for instance feed to the atomizing means or fine particles in the drying chamber 2.

Figure 5B:
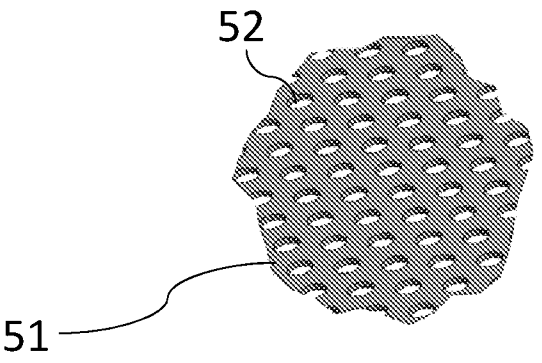
Figure 6A:
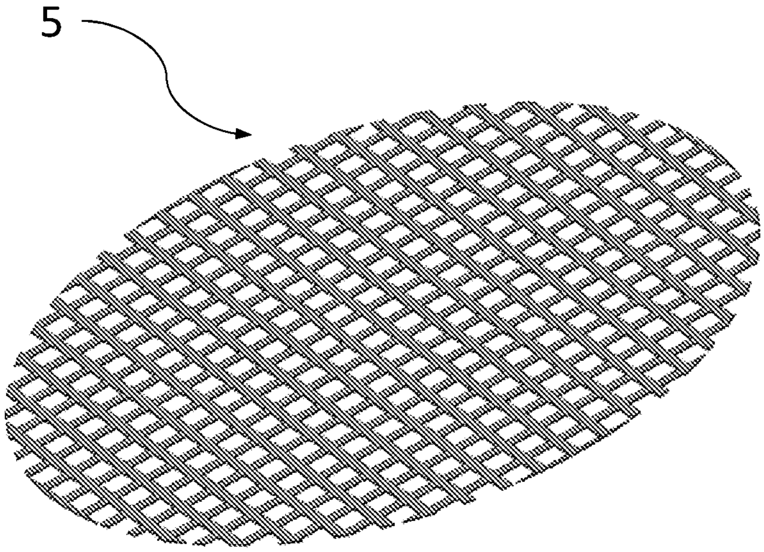
FIGS. 6*a* and 6*b* are perspective and break-out views on larger scales of a hole plate of another embodiment of the gas disperser.
Figure 6B:
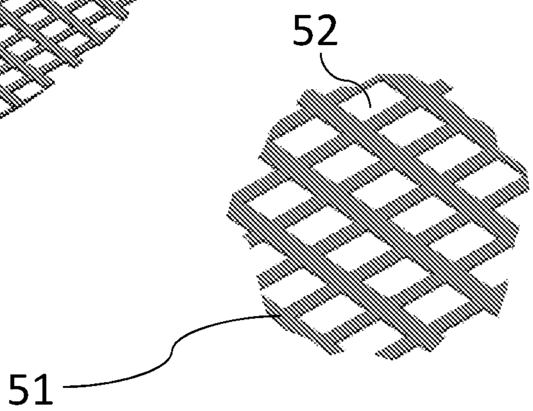
Figure 7A:
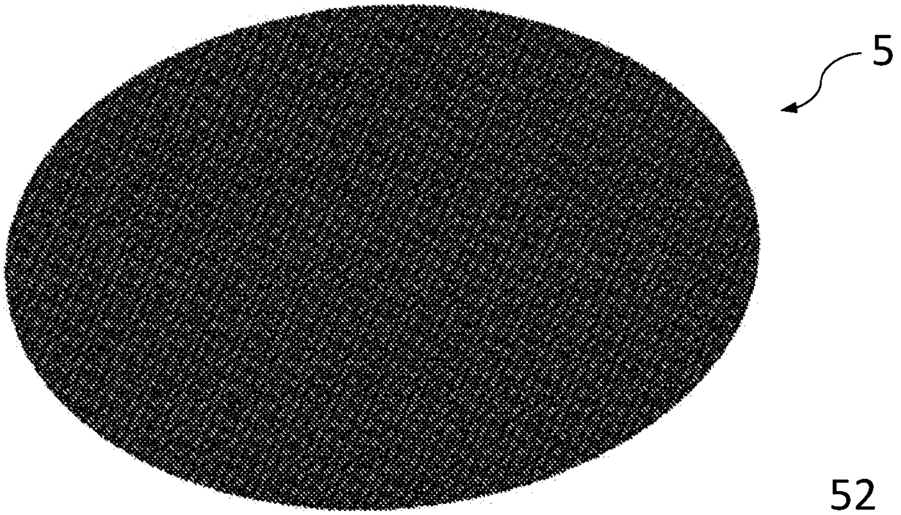
FIGS. 7*a* and 7*b* are perspective and break-out views on larger scales of a hole plate of a further embodiment of the gas disperser.
Figure 7B:
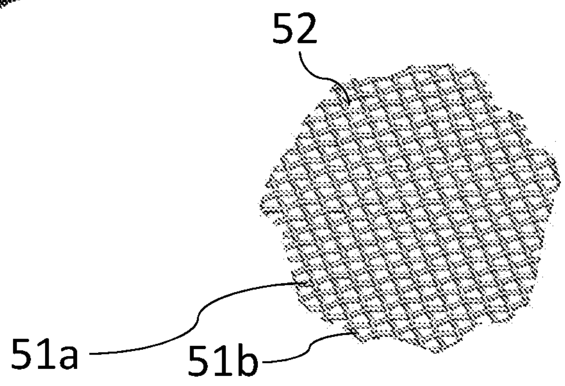

Referring now also to FIGS. 5 to 6, the hole plate 5 in one embodiment is provided a plurality of holes 52 distributed over substantially the entire cross-sectional area of the hole plate 5.

The hole plate thickness tp may be chosen in accordance with other dimensions of the gas disperser, for instance in the range 0.0005 to 0.05 of the internal diameter D of the inlet duct section 32, preferably about 0.01 of the internal diameter D of the inlet duct section 32.

The hole plate 5 constitutes a component of the inventive flow conditioning device which has high flow resistance in the main flow direction, i.e. the axial direction agd, and low resistance in other directions, i.e. to in-plane velocities, rdd and tgd. It can therefore be used to increase uniformity of the flow in the axial direction. The main adjustable parameters of a hole plate are: hole size, hole shape, open area ratio and plate thickness. With a typical internal diameter D of 1 to 2 m, the hole plate thickness tp is thus about 10-20 mm.

Regarding the size and shape of the holes 52, it tends to apply that each hole 52 has a cross-sectional dimension in the same order of magnitude as the hole plate thickness tp, i.e. 10 to 20 mm. The open area ratio, i.e. the ratio between the total area of the holes 52 and the total area of the hole plate will typically lie in the range 0.2 to 0.8, preferably about 0.5.

In principle, the shape of the holes 52 may be any suitable, for instance selected from the group comprising: circular, oval, ovoid, rectangular, polygonal.

The manufacturing of the hole plate 5 of the embodiments of FIGS. 5 and 6 is in the form of a perforated plate of plate material 51 in which the plurality of holes 52 have been provided.

Alternatively, the hole plate 5 is formed as a mesh formed by mesh threads 51*a*, 51*b* defining said plurality of holes 52 between them.

Referring now to FIGS. 8 and 9, embodiments of the gas disperser with particular focus on the flow straightener 6 will be described. The flow straightener 6 is provided with a plurality of flow channels 62, each having a longitudinal extension in parallel with the axial direction axd. In alternative embodiments, not shown, the flow straightener is formed as a spiral.

The flow straightener 6 is a component of the inventive flow conditioning device with high flow resistance in the directions perpendicular to the main flow direction, i.e. to in-plane velocities, and low resistance in the main flow direction, the axial direction axd. It can therefore be used to decrease velocities perpendicular to the main flow direction. The main adjustable parameters of a flow straightener are: length and cell size, i.e. cross-sectional dimensions of the flow channels. Flow straighteners generally have a significant extent in the main flow direction.

For instance, the flow straightener length Is is in the range 0.005 to 1 of the internal diameter D of the inlet duct section 32, preferably about 0.1 of the internal diameter D of the inlet duct section 32. With an internal diameter D as mentioned in the above, the flow straightener length Is is about 100 to 200 mm.

As is apparent from the embodiments shown in FIGS. 8 and 9, the total cross-sectional area of the flow channels 62 constitutes the majority of the cross-sectional area of the flow straightener 6. Typical values of the ratio between the total area of the flow channels 62 and the area of the flow straightener 6 lies in the range 0.8 to 0.99.

Expressed in relative dimensions to the internal diameter D of the inlet duct section 32, the number of flow channels 62 is in the range 25 to 150 per square meter of the inlet duct section 32, preferably 50 to 100, most preferable 70 to 80.

Figure 8A:
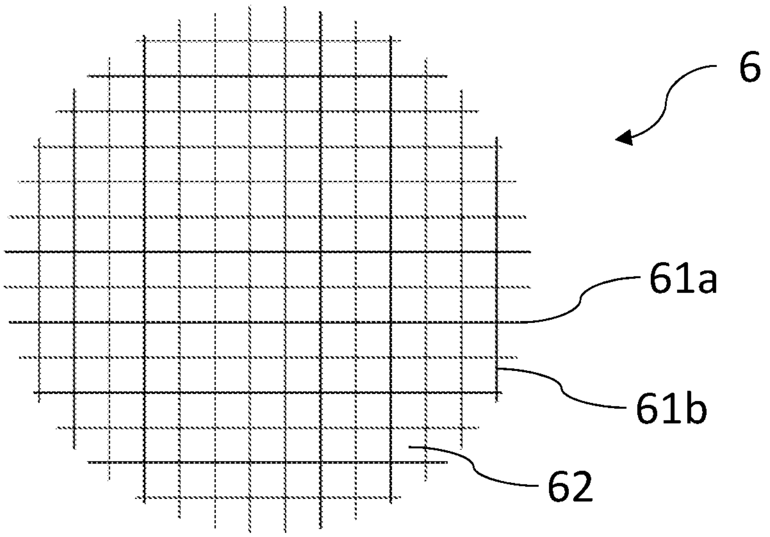
FIGS. 8*a* and 8*b* are plan and perspective views on larger scales of a flow straightener in a still further embodiment of the gas disperser.
Figure 8B:
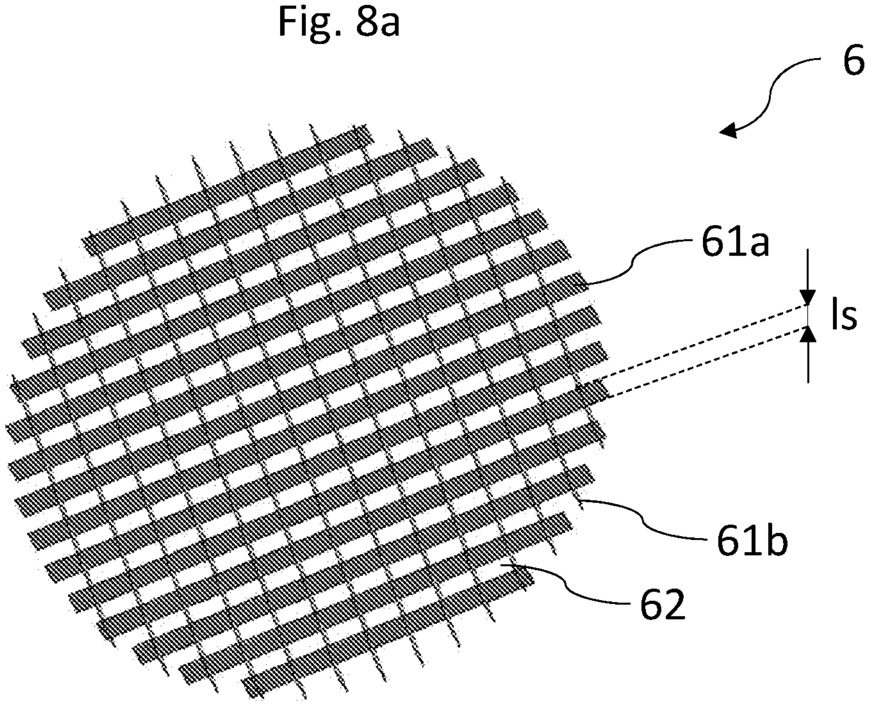

In the embodiment of FIGS. 8*a* and 8*b*, which is very simple from a constructional point of view, the flow straightener 6 comprises intersecting first and second sets of vanes 61*a*, 61*b*. Here, the vanes 61*a*, 61*b* extend at right angles to each other, thus forming a plurality of cross-sectionally rectangular flow channels 62. As the vanes of the first and the second sets of vanes 61*a*, 61*b* are positioned equidistantly the flow channels 62 are substantially square in cross-section.

Figure 9A:
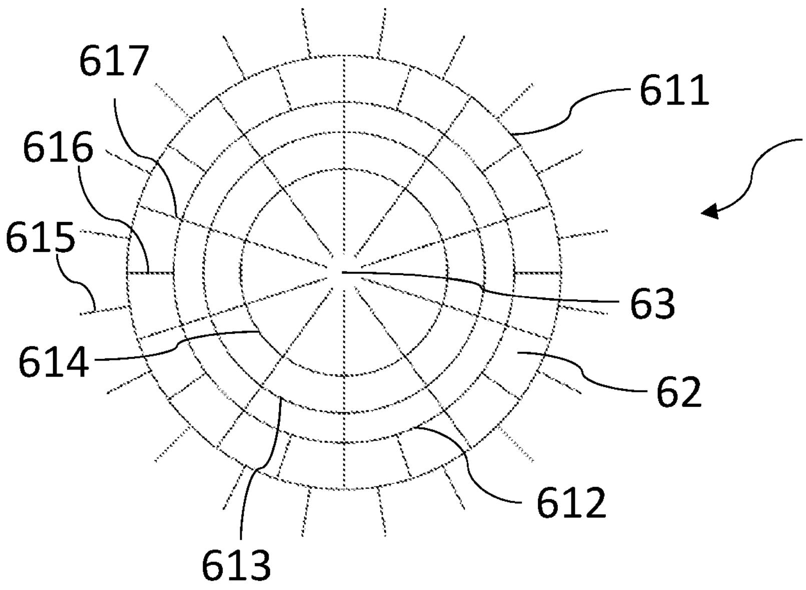
FIGS. 9*a* and 9*b* are plan and perspective views on larger scales of a flow straightener in yet another embodiment of the gas disperser.
Figure 9B:
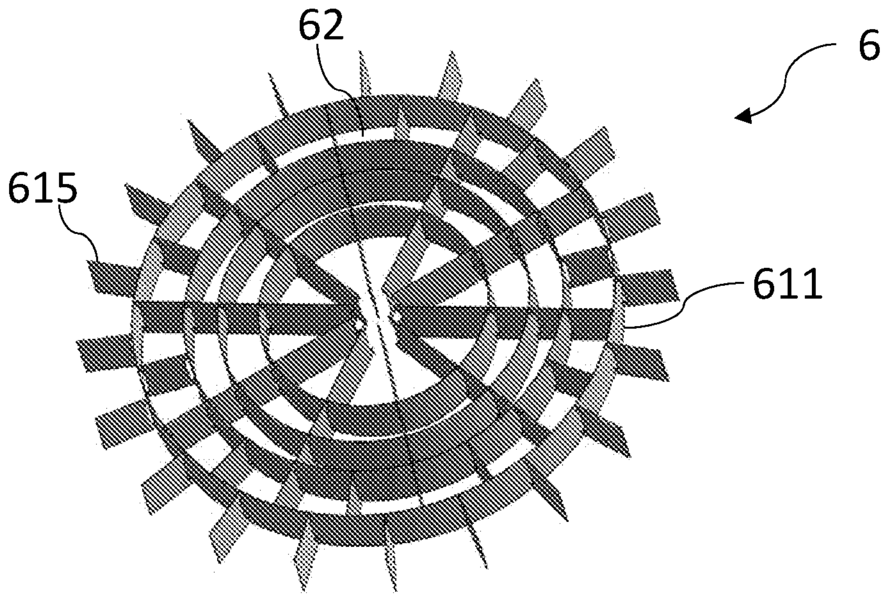

In the alternative embodiment shown in FIGS. 9*a* and 9*b*, the flow straightener 6 comprises one or more vanes extending in the tangential direction tgd. Here, four tangential vanes 611, 612, 613, 614 are provided. Intersecting the tangential vanes, a number of sets of radial vanes 615, 616, 617 are provided and together the sets form a plurality of arc-shaped flow channels 62.

The first, second, third and fourth tangential vane 611, 612, 613, 614 are here arranged concentrically, and a first, second, and third set of radial vanes 615, 616, 617 are distributed in the tangential direction tgd of the flow straightener 6. Also visible in FIG. 9*a* is central aperture 63 which in the embodiment shown is provided to accommodate central rod 33 shown in FIG. 3.

A combination of a hole plate and a flow straightener creates a new type of flow conditioning device. This device can be used to increase uniformity in the main flow direction as well as to decrease velocities perpendicular to the main flow direction.

As mentioned in the above, conditions for the combination to work most effectively include that the flow straightener should begin immediately downstream of the hole plate, typically the distance between the hole plate 5 and the flow straightener 6 should be less than 5 times the hole plate thickness tp. As will be apparent from the below exemplary configurations, it is also important to have a distance of unrestricted space upstream of the hole plate for it to work effectively. Typically, the distance upstream of hole plate 5 should be at least the same as the length of the flow straightener 6, or expressed in relative terms to the diameter D of the inlet section 32, at least 0.01 times the internal diameter D.

As mentioned in the present description, uniformity of a flow is a characteristic describing the level of variation a specific parameter in the flow e.g. velocity uniformity or temperature uniformity. A higher uniformity means that the variation in the flow is lower. The variation can be either spatial variation or temporal variation or both.

When considering spatial uniformity of the velocity in the main flow direction in an internal flow, a distinction between large scale uniformity and small scale uniformity can be made. Large scale uniformity considers the uniformity of the flow on a scale of the same order of magnitude as the length of the cross section of the internal flow e.g. the diameter in a pipe flow. An example of large scale uniformity is the difference in flow velocities between two halves of a circular pipe flow, or each quarter, or each ⅛ in a square pipe flow. Small scale uniformity instead considers the flow uniformity on a much smaller scale. An example of small scale uniformity is the non-uniformity caused by a hole plate as the flow splits into each of the holes in the hole plate.

Referring now to FIGS. 10*a* to 10*e*, a number of embodiments of the gas disperser 3 will be described.

Figure 10A:
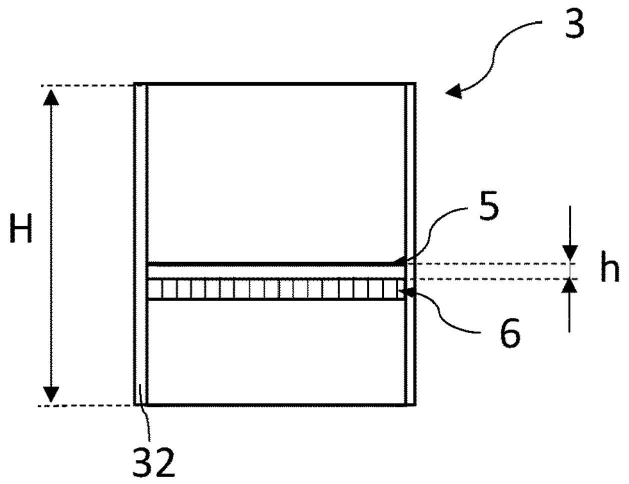
FIGS. 10*a* to 10*e* are views corresponding to FIG. 4 of further embodiments of the gas disperser according to the invention.

FIG. 10*a* is a schematic, simplified expression of the flow conditioning device according to the invention, namely a set of one hole plate 5 and one flow straightener 6 positioned directly downstream of the hole plate 5.

Figure 10B:
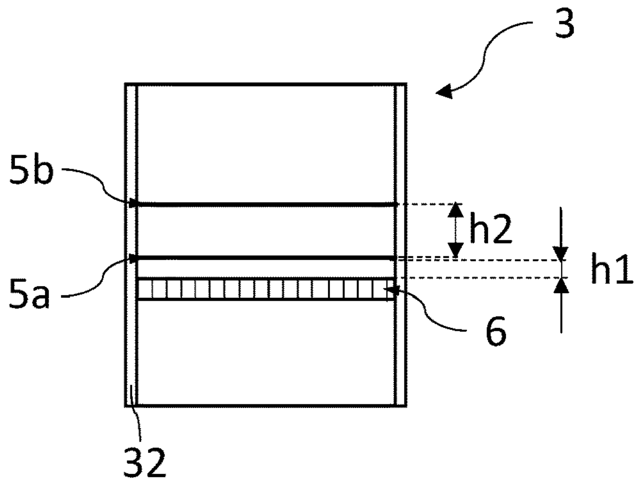

In the embodiment of FIG. 10*b*, there is a first hole plate 5*a* positioned at a first distance h1 from the upstream side of the flow straightener 6, and a second hole plate 5*b* is positioned on the upstream side of the first hole plate 5*a* at a second distance h2 from the first hole plate 5*a*, seen in the axial direction axd, the second distance h2 being preferably larger than 0.01 of the internal diameter D of the inlet duct section 32 or larger than the length Is of the flow straightener 6.

Figure 10C:
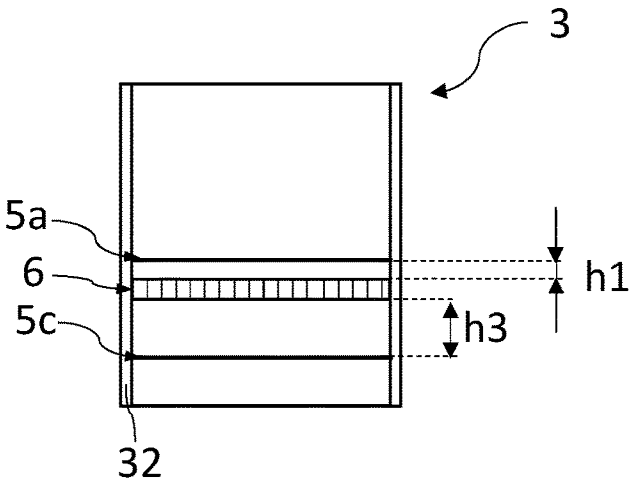

In the embodiment of FIG. 10*c*, a third hole plate 5*c* is positioned on the downstream side of the flow straightener 6 at a third distance h3 from the downstream side of the flow straightener, seen in the axial direction axd, the third distance h3 being preferably larger than 0.01 of the internal diameter D of the inlet duct section 32 or larger than the length Is of the flow straightener 6.

A combination between the embodiments of FIGS. 10*b* and 10*c* is of course conceivable.

Figure 10D:
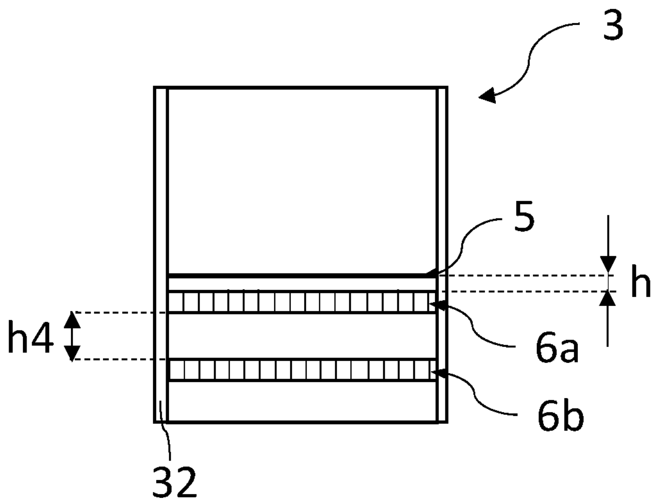

In the embodiment of FIG. 10*d*, a first flow straightener 6*a* is positioned directly downstream of the single hole plate 5 and a second flow straightener 6*b* is provided on the downstream side of the first flow straightener 6*a* at a fourth distance h4 from the downstream side of the first flow straightener 6*a*.

Figure 10E:
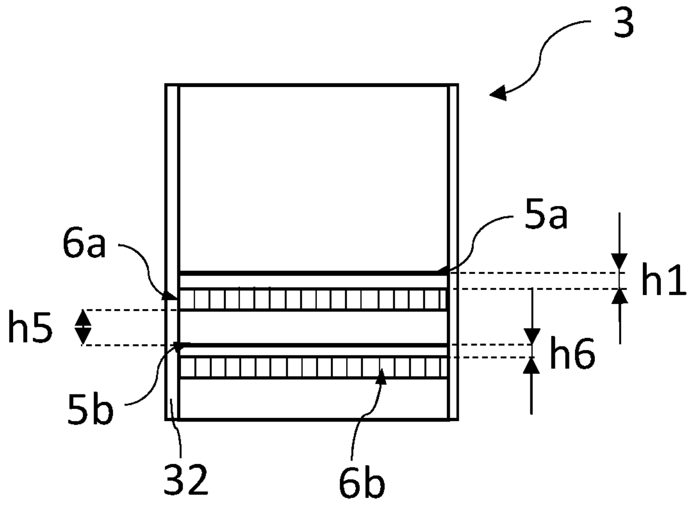

Finally, in the embodiment of FIG. 10*e* a second hole plate 5*b* is provided upstream of the second flow straightener 6*b*, at a fifth distance h5 from the downstream side of the first flow straightener 6*a*, and at a sixth distance h6 from the upstream side of the second flow straightener 6*b*, to form two sets of one upstream hole plate 5; 5*a*; 5*b* and one downstream flow straightener 6; 6*a*; 6*b* located at a distance h; h1; h6 from the respective hole plate, the fifth distance h5 being preferably larger than 0.01 of the internal diameter D of the inlet duct section 32 or larger than the length Is of the flow straightener 6.

In this way two sets of one upstream hole plate 5*a*, 5*b* and one downstream flow straightener 6*a*, 6*b* are provided. Each set has its own coefficient of performance, which may be the same or different dependent on the configuration of the individual set, and by combining two, three or more sets, the desired total flow conditioning effect may be attained.

The hole plate or plates 5 and the flow straightener(s) 6 may be provided as spare parts configured for retrofitting into an existing gas disperser.

Depending on whether the flow conditioning device of the invention is provided for retrofitting, as spare parts, or as an integral part of the gas disperser, the connection between the flow conditioning device and the inlet duct section may in principle be carried out in any suitable manner. As one possibility, each hole plate 5 and/or each flow straightener 6 are connected to the inlet duct section 32 of the gas disperser by releasable mechanical fastening means. Alternatively, each hole plate 5 and/or each flow straightener 6 are connected to the inlet duct section 32 of the gas disperser by permanent attachment such as welding. Regardless of how the parts are connected, all parts should be easily cleanable for instance by a Cleaning-in-Place (CIP) procedure.

During operation of the inventive gas disperser and spray drying apparatus, the stream of gas is thus aligned in its path from the supply to the drying chamber. Without wishing to be bound by theory, the following operational steps are run through:

The stream of gas containing velocity components in the axial direction axd, the radial direction rdd and the tangential direction tgd is allowed to enter the upstream end 32*a* of the inlet duct section 32.

First, the stream is subjected to flow resistance generally in parallel with the axial direction axd, from the at least one hole plate 5, whereby the axial velocity components are distributed over the cross-sectional area of the inlet duct section 32.

Second, the stream is subjected to flow resistance generally in the radial and tangential directions rdd, tgd from the at least one flow straightener 6, whereby the radial and tangential velocity components are reduced.

The invention is not limited to the embodiments shown and described in the above, but various modifications and combinations may be carried out.

LIST OF REFERENCE NUMERALS

1 spray drying apparatus
2 drying chamber
3 gas disperser
31 supply duct section
32 inlet duct section
32*a* upstream end
32*b* downstream end

33 central rod
4 outlet
5 hole plate
5*a* first hole plate
5*b* second hole plate
5*c* third hole plate
51 plate material
51*a* thread of mesh
51*b* thread of mesh
52 holes
6 flow straightener
6*a* first flow straightener
6*b* second flow straightener
61*a* first set of vanes
61*b* second set of vanes
611 first tangential vane
612 second tangential vane
613 third tangential vane
614 fourth tangential vane
615 first set of radial vanes
616 second set of radial vanes
617 third set of radial vanes
62 flow channels
63 central aperture
axd axial direction
rdd radial direction
tgd tangential direction
h distance between hole plate(s)/flow straightener(s) in axial direction
H length of inlet duct section
D internal diameter of inlet duct section
tp thickness of hole plate
Is length of flow straightener in axial direction

The invention claimed is:

1. A spray drying apparatus comprising:

at least one gas disperser for guiding gas into a drying chamber, said gas disperser comprising:

an inlet duct section with an upstream end and a downstream end, and with an internal diameter defining a cross-sectional area, the inlet duct section defining an axial direction, a radial direction, and a tangential direction, and a flow conditioning device located in the inlet duct section and having a diameter substantially corresponding to an internal diameter of the inlet duct section, the flow conditioning device comprising:

at least one hole plate having a plurality of holes distributed over substantially an entire cross-sectional area of the hole plate, wherein the hole plate has a hole plate thickness, wherein each of said plurality of holes has a respective cross-sectional dimension defined as the longest straight line between two perimeter points of the respective hole, and wherein the hole plate thickness and each of said cross-sectional dimensions are of the same order of magnitude; and at least one flow straightener positioned downstream of the at least one hole plate and substantially parallel to and at a distance in the axial direction from a downstream side of the at least one hole plate, the flow straightener having a plurality of flow channels, each having a longitudinal extension parallel to the axial direction, wherein the plurality of flow channels extend farther in the axial direction than a hole plate thickness by a factor in a range of 5 to 200.

2. The spray drying apparatus of claim 1, wherein the hole plate thickness is in a range of 0.0005 to 0.05 of the internal diameter of the inlet duct section.

3. The spray drying apparatus of claim 1, wherein a flow channel length is in a range of 0.005 to 1 of the internal diameter of the inlet duct section.

4. The spray drying apparatus of claim 1, wherein the plurality of holes are shaped as one or more of circular, oval, ovoid, rectangular, and polygonal.

5. The spray drying apparatus of claim 1, wherein the at least one hole plate is formed as a mesh formed by mesh threads defining the plurality of holes between them.

6. The spray drying apparatus of claim 1, wherein the at least one flow straightener comprises intersecting first and second sets of vanes forming a plurality of cross-sectionally rectangular flow channels.

7. The spray drying apparatus of claim 1, wherein the at least one flow straightener comprises at least one tangential vane and at least one set of radial vanes forming a plurality of arc-shaped flow channels.

8. The spray drying apparatus of claim 7, wherein the at least one flow straightener comprises first, second, third and fourth tangential vanes arranged concentrically.

9. The spray drying apparatus of claim 1, having in a range of 25 to 150 flow channels per square meter of the cross-sectional area defined by the internal diameter of the inlet duct section.

10. The spray drying apparatus of claim 1, wherein a distance separating the at least one flow straightener from the downstream side of the at least one hole plate in the axial direction is below 100 times the hole plate thickness.

11. The spray drying apparatus of claim 1, wherein the at least one hole plate comprises two hole plates.

12. The spray drying apparatus of claim 11, wherein both hole plates are upstream from the at least one flow straightener.

13. The spray drying apparatus of claim 12, further comprising a third hole plate positioned on a downstream side of the at least one flow straightener.

14. The spray drying apparatus of claim 1, wherein the at least one flow straightener comprises two flow straighteners.

15. The spray drying apparatus of claim 14, wherein the at least one hole plate comprises a first hole plate and a second hole plate, wherein the first hole plate is disposed upstream of the first flow straightener and the second hole plate is disposed downstream of the first flow straightener and upstream of the second flow straightener.

* * * * *